(12) United States Patent
Kim et al.

(10) Patent No.: US 10,277,025 B2
(45) Date of Patent: Apr. 30, 2019

(54) SAFETY APPARATUS OF FUEL CELL VEHICLE AND METHOD FOR CONTROLLING THE SAFETY APPARATUS

(71) Applicant: Hyundai Motor Company, Seoul (KR)

(72) Inventors: JuHan Kim, Gyeonggi-Do (KR); Young Bum Kum, Seoul (KR); Yong Sun Park, Gyeonggi-Do (KR); Soon Il Jeon, Gyeonggi-Do (KR); Nam Woo Lee, Gyeonggi-do (KR); Sae Hoon Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 880 days.

(21) Appl. No.: 14/838,730

(22) Filed: Aug. 28, 2015

(65) Prior Publication Data

US 2016/0141863 A1 May 19, 2016

(30) Foreign Application Priority Data

Nov. 19, 2014 (KR) .................. 10-2014-0161873

(51) Int. Cl.
*H01M 8/04* (2016.01)
*H02H 3/16* (2006.01)
*H01M 10/42* (2006.01)
*H01M 16/00* (2006.01)
*H01M 8/04664* (2016.01)
(Continued)

(52) U.S. Cl.
CPC .......... *H02H 3/16* (2013.01); *H01M 8/04686* (2013.01); *H01M 8/04753* (2013.01); *H01M 10/425* (2013.01); *H01M 16/006* (2013.01); *H02H 11/005* (2013.01); *H01M 2250/20* (2013.01); *Y02T 90/32* (2013.01)

(58) Field of Classification Search
CPC ......... H01M 8/04686; H01M 8/04753; H01M 10/425; H01M 16/006; H01M 2250/20; H01M 8/04; H02H 3/16; H02H 11/005; Y02T 90/32; Y02T 10/7241; B60K 16/00; B60K 16/20; B60K 16/26; Y02E 10/563; B60L 3/04; B60L 15/00; B60L 3/00; G01R 31/02
See application file for complete search history.

(56) References Cited

U.S. PATENT DOCUMENTS

| | | | |
|---|---|---|---|
| 2002/0094467 A1* | 7/2002 | Nonobe | H01M 8/04097 429/411 |
| 2007/0003805 A1* | 1/2007 | Sugawara | H01M 8/04231 429/423 |
| 2011/0148355 A1* | 6/2011 | Nakamura | B60L 11/1824 320/109 |

FOREIGN PATENT DOCUMENTS

| | | |
|---|---|---|
| JP | 2001-124814 A | 5/2001 |
| JP | 2004-020530 A | 1/2004 |

(Continued)

*Primary Examiner* — Anthony R Jimenez
(74) *Attorney, Agent, or Firm* — Mintz Levin Cohn Ferris Glovsky and Popeo, P.C.; Peter F. Corless (57) ABSTRACT

A safety apparatus uses a fuel cell and a high voltage battery as a power source, and includes: a first voltage sensor that measures a voltage of a positive side of a voltage bus; a second voltage sensor that measures a voltage of a negative side of the voltage bus; and a controller that determines an electrical insulation between the positive side of the voltage bus and the electrical chassis based on the voltage of the positive side of the voltage bus and determines an electrical insulation between the negative side of the voltage bus and the electrical chassis based on the voltage of the negative side of the voltage bus.

17 Claims, 6 Drawing Sheets

(51) Int. Cl.
*H01M 8/04746* (2016.01)
*H02H 11/00* (2006.01)

(56) References Cited

FOREIGN PATENT DOCUMENTS

| | | | |
|---|---|---|---|
| KR | 10-0534768 | B1 | 12/2005 |
| KR | 10-0792942 | B1 | 1/2008 |

* cited by examiner

SAFETY APPARATUS OF FUEL CELL VEHICLE AND METHOD FOR CONTROLLING THE SAFETY APPARATUS

CROSS-REFERENCE TO RELATED APPLICATION

This application claims under 35 U.S.C. § 119(a) the benefit of Korean Patent Application No. 10-2014-0161873 filed in the Korean Intellectual Property Office on Nov. 19, 2014, the entire contents of which are incorporated herein by reference.

BACKGROUND (a) Field of the Invention

The present invention relates to a safety apparatus of a fuel cell vehicle and a method for controlling the safety apparatus.

(b) Description of the Related Art

A fuel cell refers to a power generation device which directly converts chemical energy generated by oxidizing a fuel into electrical energy. The fuel cell may be similar to a chemical battery since both basically use an oxidation and reduction reaction, but the fuel cell may be different from the chemical battery because in the fuel cell, reactants are continuously supplied from the exterior and reaction products are removed to the exterior of a system. However, in the chemical battery, battery reaction is performed in a closed system. Since the fuel cell generates the reaction products such as water, research into a fuel cell vehicle as an environmentally-friendly vehicle has been actively pursued.

A plurality of collision sensors may be provided to sense a collision of a fuel cell vehicle. For example, an air bag control unit (ACU) determines whether or not to expand an air bag based on signals input from the plurality of collision sensors.

When the collision of the fuel cell vehicle is determined only based on the signals input from the plurality of collision sensors, however, it is difficult or impossible to determine if an actual collision has occurred. For example, in the event of a failure of the collision sensor itself, disconnection or short-circuit of a wire connected to the collision sensor, a failure of an output signal of the collision sensor, or the like, occurrence of an actual collision may not be determined. Some high voltage systems of the fuel cell vehicle may be damaged due to flooding, a low speed collision that is not sufficient to expand the air bag, or a specific collision (e.g., a curb strike) that occurs out of a sensing range of the collision sensor, and consequently, a secondary accident such as an electric shock accident or an electrical fire may occur.

The above information disclosed in this Background section is only for enhancement of understanding of the background of the invention and therefore it may contain information that does not form the prior art that is already known in this country to a person of ordinary skill in the art.

SUMMARY

The present invention provides a safety apparatus of a fuel cell vehicle and a method for controlling the safety apparatus having advantages of being capable of preventing an electric shock accident by determining whether or not an electrical insulation between a power source and an electrical chassis is maintained.

A safety apparatus of a fuel cell vehicle having a fuel cell and a high voltage battery that function as a power source according to a first exemplary embodiment of the present invention may include: a first voltage sensor configured to measure a voltage of a positive side of a voltage bus; a second voltage sensor configured to measure a voltage of a negative side of the voltage bus; and a controller configured to determine an electrical insulation between the positive side of the voltage bus and an electrical chassis based on the voltage of the positive side of the voltage bus and determine an electrical insulation between the negative side of the voltage bus and the electrical chassis based on the voltage of the negative side of the voltage bus, wherein the controller may determine that insulation breakdown between the positive side of the voltage bus and the electrical chassis has occurred when a state where the voltage of the positive side of the voltage bus is less than or equal to a first predetermined value is maintained for a predetermined time and determine that insulation breakdown between the negative side of the voltage bus and the electrical chassis has occurred when a state where the voltage of the negative side of the voltage bus is greater than or equal to a second predetermined value is maintained for the predetermined time.

When the controller determines that the insulation breakdown between the positive side of the voltage bus and the electrical chassis or the insulation breakdown between the negative side of the voltage bus and the electrical chassis has occurred, the controller may enter a safe mode.

The safety apparatus may further include: a first relay disposed on the positive side of the voltage bus; and a second relay disposed on the negative side of the voltage bus, wherein the controller may turn off the first relay and the second relay to shut off power supplied to the power load in the safe mode.

The safety apparatus may further include a first valve disposed on a hydrogen supply line connecting a hydrogen tank and the fuel cell to each other, wherein the controller may be configured to open or close the first valve, and wherein the first valve may be completely closed to shut off hydrogen supplied to the fuel cell in the safe mode.

The safety apparatus may further include a second valve disposed on an air supply line connecting an air blower and the fuel cell to each other, wherein the controller may be configured to open or close the second valve, and wherein the second valve may be completely closed to shut off air supplied to the fuel cell in the safe mode.

The safety apparatus may further include a vehicle speed detector configured to detect a speed of the fuel cell vehicle, wherein when a state where the voltage of the positive side of the voltage bus is less than or equal to the first predetermined value is maintained for the predetermined time and the speed of the fuel cell vehicle is less than or equal to a predetermined speed, or when a state where the voltage of the negative side of the voltage bus is greater than or equal to the second predetermined value is maintained for the predetermined time and the speed of the fuel cell vehicle is less than or equal to the predetermined speed, the controller may enter the safe mode.

A method for controlling a safety apparatus of a fuel cell vehicle having a fuel cell and a high voltage battery that function as a power source according to the first exemplary embodiment of the present invention may include: receiving a voltage of a positive side of a voltage bus and a voltage of a negative side of the voltage bus; determining that insulation breakdown between the positive side of the voltage bus and an electrical chassis has occurred when a state where the voltage of the positive side of the voltage bus is less than or equal to a first predetermined value is maintained for a predetermined time; and determining that insulation breakdown between the negative side of the voltage bus and the electrical chassis has occurred when a state where the voltage of the negative side of the voltage bus is greater than or equal to a second predetermined value is maintained for the predetermined time.

The method may further include entering a safe mode when determining that the insulation breakdown between the positive side of the voltage bus and the electrical chassis or the insulation breakdown between the negative side of the voltage bus and the electrical chassis has occurred.

The method may further include: turning off a first relay disposed on the positive side of the voltage bus in the safe mode; turning off a second relay disposed on the negative side of the voltage bus in the safe mode; completely closing a first valve disposed on a hydrogen supply line connecting a hydrogen tank and the fuel cell to each other in the safe mode; and completely closing a second valve disposed on an air supply line connecting an air blower and the fuel cell to each other in the safe mode.

A safety apparatus of a fuel cell vehicle having a fuel cell and a high voltage battery that function as a power source according to a second exemplary embodiment of the present invention may include: a zero-sequence current transformer (ZCT) surrounding a voltage bus; and a controller configured to determine an electrical insulation between the power source and an electrical chassis based on a voltage induced to the ZCT, wherein the controller may generate a warning signal when the voltage induced to the ZCT is greater than or equal to a first predetermined value.

The controller may determine that insulation breakdown between the power source and the electrical chassis has occurred when a state where the voltage induced to the ZCT is greater than or equal to a second predetermined value is maintained for a predetermined time.

When the controller determines that the insulation breakdown between the power source and the electrical chassis has occurred, the controller may enter a safe mode.

The safety apparatus may further include: a first relay disposed on a positive side of the voltage bus; and a second relay disposed on a negative side of the voltage bus, wherein the controller may turn off the first and second relays to shut off power supplied to the power load in the safe mode.

The ZCT may be interposed among the power source, the first relay, and the second relay.

The safety apparatus may further include a first valve disposed on a hydrogen supply line connecting a hydrogen tank and the fuel cell to each other, wherein the controller may be configured to open or close the first valve, and wherein the first valve is completely closed to shut off hydrogen supplied to the fuel cell in the safe mode.

The safety apparatus may further include a second valve disposed on an air supply line connecting an air blower and the fuel cell to each other, wherein the controller may be configured to open or close the second valve, and wherein the second valve is completely closed to shut off air supplied to the fuel cell in the safe mode.

The safety apparatus may further include a vehicle speed detector configured to detect a speed of the fuel cell vehicle, wherein when a state where the voltage induced to the ZCT is greater than or equal to the second predetermined value is maintained for the predetermined time and the speed of the fuel cell vehicle is less than or equal to a predetermined speed, the controller may enter the safe mode.

A method for controlling a safety apparatus of a fuel cell vehicle having a fuel cell and a high voltage battery that function as a power source according to a second exemplary embodiment of the present invention may include: receiving a voltage induced to a zero-sequence current transformer (ZCT) surrounding a voltage bus, and generating a warning signal when the voltage induced to the ZCT is greater than or equal to a first predetermined value.

The method may further include determining that insulation breakdown between the power source and an electrical chassis has occurred when a state where the voltage induced to the ZCT is greater than or equal to a second predetermined value is maintained for a predetermined time.

The method may further include: entering a safe mode when determining that the insulation breakdown between the power source and the electrical chassis has occurred; turning off a first relay disposed on a positive side of the voltage bus in the safe mode; turning off a second relay disposed on a negative side of the voltage bus in the safe mode; completely closing a first valve disposed on a hydrogen supply line connecting a hydrogen tank and the fuel cell to each other in the safe mode; and completely closing a second valve disposed on an air supply line connecting an air blower and the fuel cell to each other in the safe mode.

According to various exemplary embodiments of the present invention, it may be rapidly determined that the electrical insulation between the power source and the electrical chassis is maintained. In addition, an electric shock accident may be prevented by shutting off the supply of power, hydrogen, and air when the electrical insulation is failed.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Further, each configuration illustrated in the drawings is arbitrarily shown for better understanding and ease of description, but the present invention is not limited thereto.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
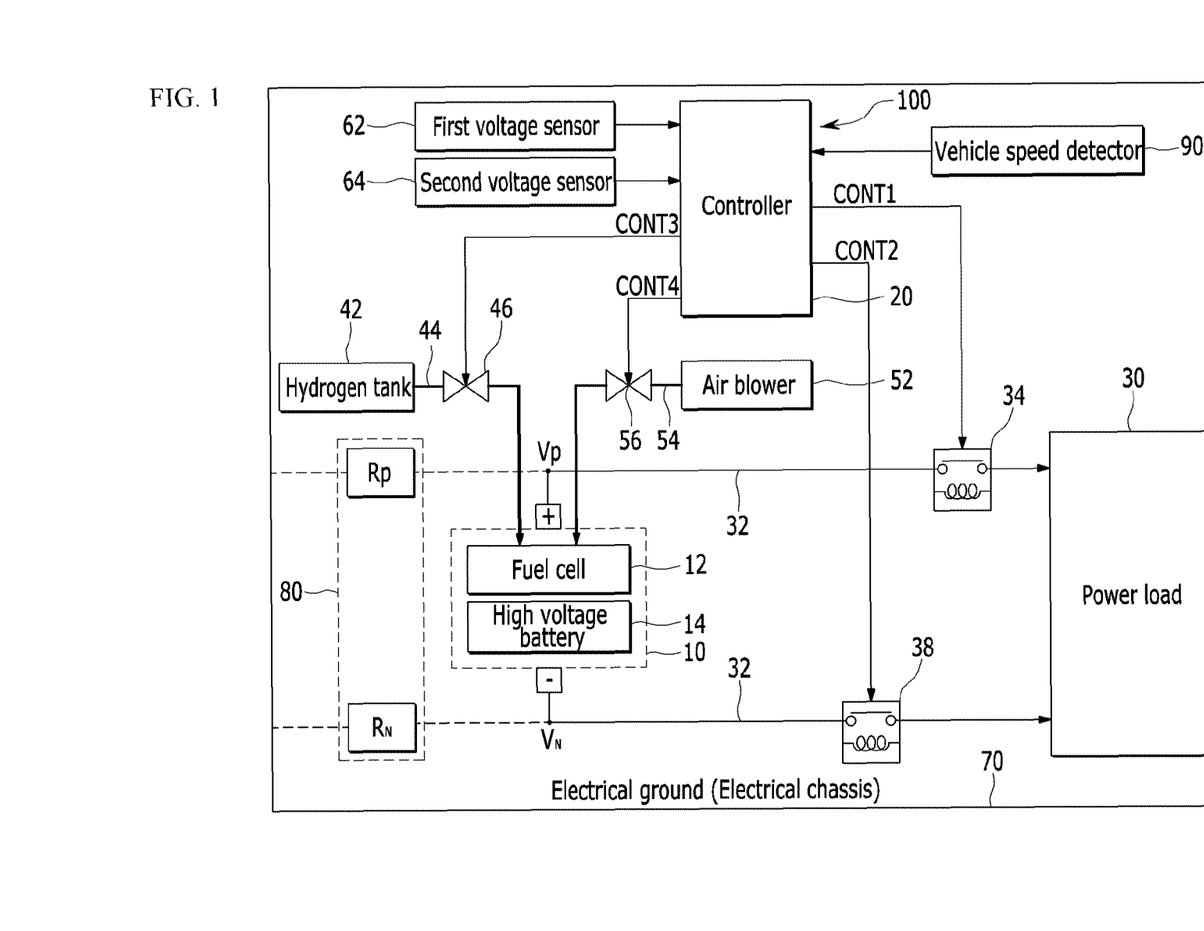
FIG. 1 is a block diagram of a fuel cell vehicle according to a first exemplary embodiment of the present invention.

FIG. 1 illustrates an exemplary fuel cell vehicle according to a first exemplary embodiment of the present invention.

As shown in FIG. 1, a fuel cell vehicle according to the first exemplary embodiment of the present invention uses a power source 10 including a fuel cell 12 and a high voltage battery 14. In particular, the fuel cell 12 and the high voltage battery 14 preferably together serve or function as the power source 10. A safety apparatus 100 of the fuel cell vehicle according to the first exemplary embodiment of the present invention may shut off power supplied to a power load 30 and hydrogen supplied from a hydrogen tank 42 to the fuel cell 12 according to control of a controller 20.

The power load 30 may include a driving motor driving the fuel cell vehicle and a variety of electronic devices that use power.

The fuel cell 12 generates power by an electrical and chemical reaction of hydrogen as a fuel and air as an oxidizing agent. The generated power may be supplied to the power load 30.

The hydrogen stored in the hydrogen tank 42 may be supplied to the fuel cell 12 through a hydrogen supply line 44. A first valve 46 is disposed on the hydrogen supply line 44 connecting the hydrogen tank 42 and the fuel cell 12 to each other. The first valve 46 may be opened or closed according to the control of the controller 20, and when the first valve 46 is completely closed, the supply of hydrogen may be shut off.

An air blower 52 may supply external air including oxygen to the fuel cell 12 through an air supply line 54. A second valve 56 is disposed on the air supply line 54. The second valve 56 may be opened or closed according to the control of the controller 20, and when the second valve 56 is completely closed, the supply of air may be shut off.

A first relay 34 is disposed on a positive side of a voltage bus 32, and a second relay 38 is disposed on a negative side of the voltage bus 32. While the first relay 34 and the second relay 38 are in a turn-on state (i.e., an "on" state), the power generated from the power source 10 may be supplied to the power load 30.

The first voltage sensor 62 may measure a voltage $V_P$ of the positive side of the voltage bus 32 and transmit a signal corresponding thereto to the controller 20. The second voltage sensor 62 may measure a voltage $V_N$ of the negative side of the voltage bus 32 and transmit a signal corresponding thereto to the controller 20. The first and second voltage sensors 62 and 64 according to the first exemplary embodiment of the present invention may be sufficient if they can measure the voltage $V_P$ of the positive side of the voltage bus 32 and the voltage $V_N$ of the negative side of the voltage bus 32, respectively. Alternatively, additional voltage sensors may be provided. For example, each of the first and second voltage sensors 62 and 64 may be replaced by a voltage sensing circuit that is formed on a substrate. Thus, in the present specification and the claims, it is to be understood that the first and second voltage sensors 62 and 64 can include any device that can measure the voltage $V_P$ of the positive side of the voltage bus 32 and the voltage $V_N$ of the negative side of the voltage bus 32.

An electrical chassis 70 may serve as an electrical ground of the fuel cell vehicle.

An insulation resistor $R_P$ is equivalent to a resistance component between the positive side of the voltage bus 32 and the electrical chassis 70, and an insulation resistance $R_N$ is equivalent to a resistance component between the negative side of the voltage bus 32 and the electrical chassis 70. When the insulation resistors $R_P$ and $R_N$ are in a normal state, insulation resistances of the insulation resistors $R_P$ and $R_N$ are infinite in theory.

Conventionally, an insulation resistance measuring device 80 is provided in the fuel cell vehicle in order to measure insulation resistances of the insulation resistors $R_P$ and $R_N$. The insulation resistances needs to be greater than about 100 [Ω/Vdc] for a safety property of the fuel cell vehicle. The insulation resistance measuring device 80 includes a plurality of switching elements, a detection resistor, and the like. If the electrical insulation between the power source 10 and the electrical chassis 70 fails (i.e., a leakage current flows from the power source 10 through the insulation resistor $R_P$ or $R_N$), a leakage current flows to the insulation resistance measuring device 80, and then the insulation resistance measuring device 80 may measure insulation resistance of the insulation resistor $R_P$ or $R_N$ by using a voltage at both ends of the detection resistor. The insulation resistance is transmitted to the controller 20.

The controller 20 may be implemented by at least one microprocessorexecuted by a predetermined program. The predetermined program may include a series of commands for performing each step included in a method for controlling the safety apparatus 100 of the fuel cell vehicle according to the first exemplary embodiment of the present invention to be described below.

The controller 20 may control operations of the first relay 34, the second relay 38, the first valve 46, and the second valve 56.

A vehicle speed detector 90 may detect a speed of the fuel cell vehicle and may be mounted at a wheel of the fuel cell vehicle.

Hereinafter, the method for controlling the safety apparatus of the fuel cell vehicle according to the first exemplary embodiment of the present invention will be described in more detail with reference to FIGS. 2 to 4.

Figure 2:
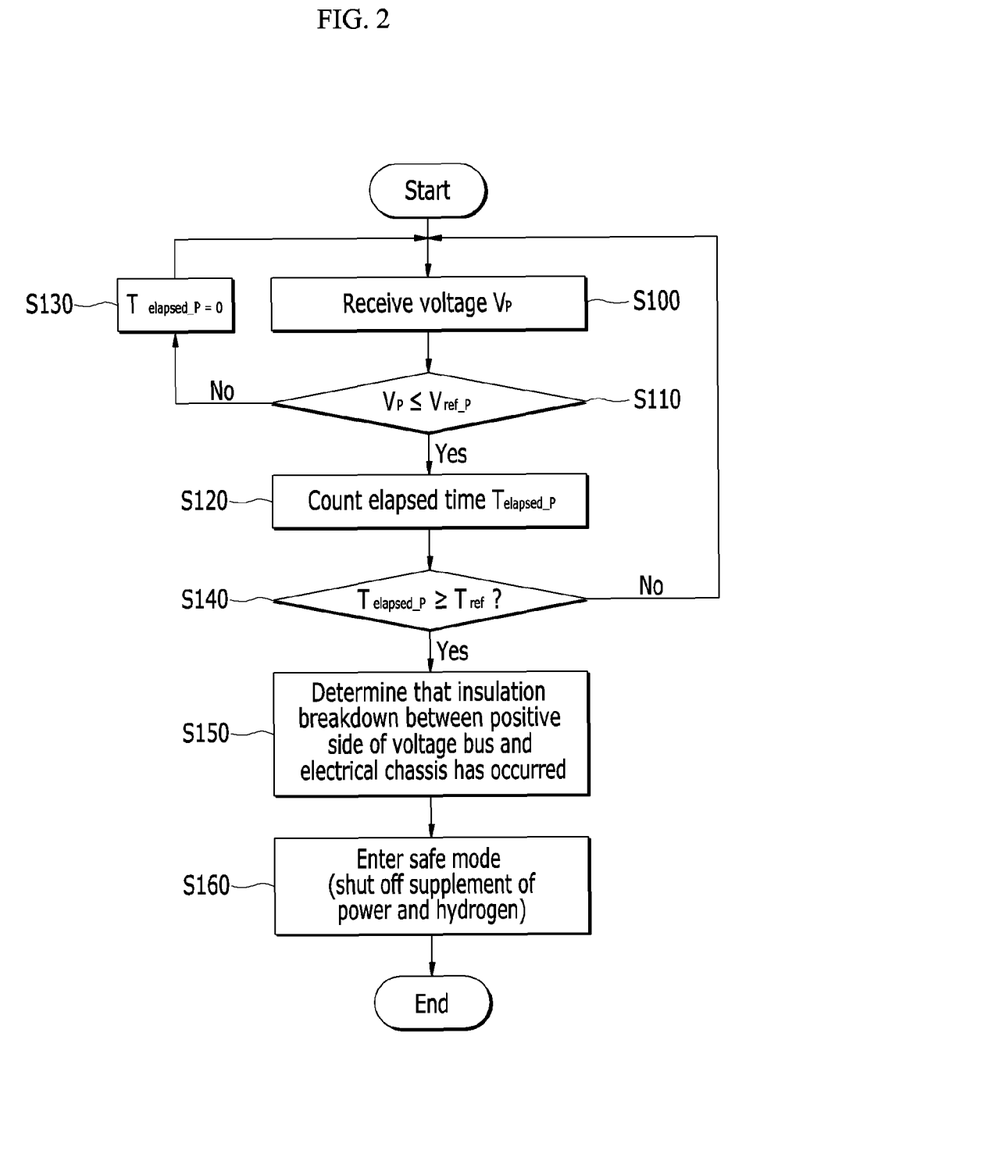
FIG. 2 is a flow chart of a method for controlling a safety apparatus of a fuel cell vehicle based on a voltage of a positive side of a voltage bus according to the first exemplary embodiment of the present invention.
Figure 3:
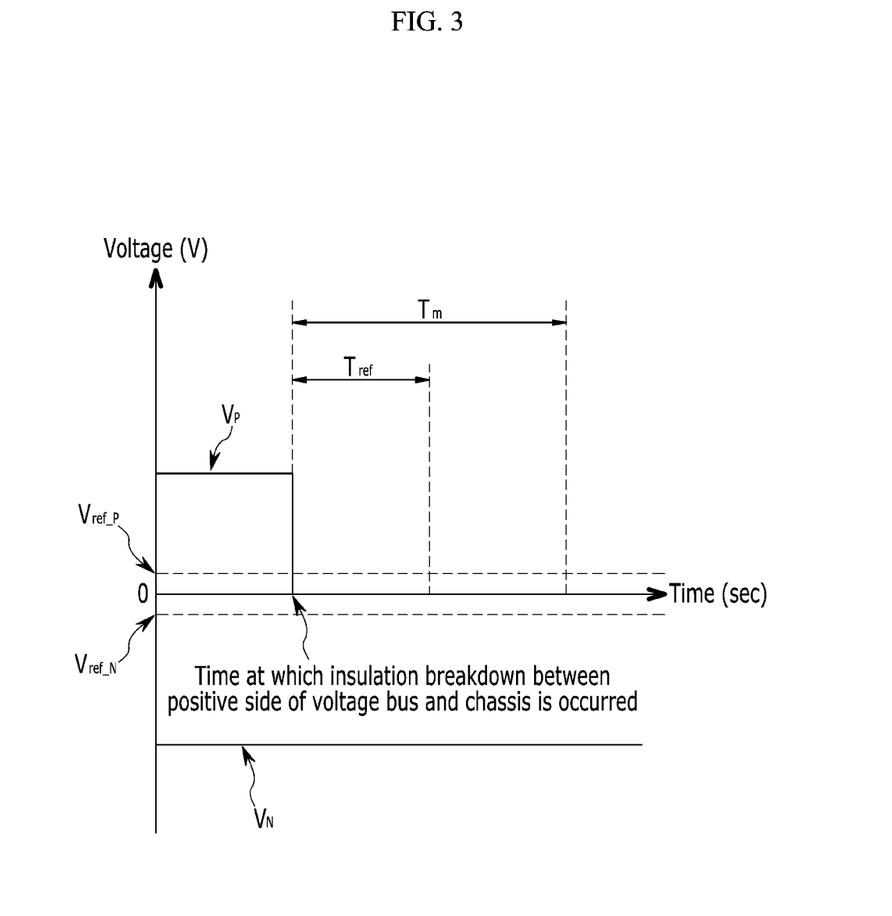
FIG. 3 is a graph for explaining a method for controlling a safety apparatus of a fuel cell vehicle according to the first exemplary embodiment of the present invention.

FIG. 2 illustrates an exemplary method for controlling a safety apparatus of a fuel cell vehicle based on a voltage of a positive side of a voltage bus according to the first exemplary embodiment of the present invention, and FIG. 3 illustrates a graph for explaining a method for controlling a safety apparatus of a fuel cell vehicle according to the first exemplary embodiment of the present invention.

Referring FIGS. 2 and 3, the controller 20 may receive the voltage $V_P$ of the positive side of the voltage bus 32 from a first voltage sensor 62 at step S100. The controller 20 may compare the voltage $V_P$ and a predetermined value $V_{ref\_P}$ at step S110. The predetermined value $V_{ref\_P}$ may be a value close to zero, and may be set to a value which is determined by a person of an ordinary skill in the art to determine whether insulation breakdown between the positive side of the voltage bus 32 and the electrical chassis 70 has occurred. When the voltage $V_P$ is less than or equal to the predetermined value $V_{ref\_P}$ at step S110, the controller 20 may count an elapsed time $T_{elapsed\_P}$ after the voltage $V_P$ reaches the predetermined value $V_{ref\_P}$ at step S120.

When the voltage $V_P$ is greater than the predetermined value $V_{ref\_P}$ at step S110, the controller 20 may reset the counted elapsed time $T_{elapsed\_P}$ to zero at step S130. The controller 20 may compare the elapsed time $T_{elapsed\_P}$ and a predetermined time $T_{ref}$ at step S140. The predetermined time $T_{ref}$ may be set to a value which is determined by a person of ordinary skill in the art. The predetermined time $T_{ref}$ may be set to a value that is less than a time $T_m$. The time $T_m$ is a time that is spent to measure the insulation resistance by using the voltage at both ends of the detection resistor through switching operations of the plurality of switching elements of the insulation resistance measuring device 80. Thus, it is possible to rapidly determine whether insulation breakdown has occurred earlier than when using the insulation resistance.

When the elapsed time $T_{elapsed\_P}$ is less than the predetermined time $T_{ref}$ at step S140, the controller 20 may restart from the step S100.

When the elapsed time $T_{elapsed\_P}$ is greater than or equal to the predetermined time $T_{ref}$ at step S140, the controller 20 may determine that insulation breakdown between the positive side of the voltage bus 32 and the electrical chassis 70 has occurred at step S150.

In summary, when the state where the voltage $V_P$ of the positive side of the voltage bus 32 is less than or equal to the predetermined value $V_{ref\_P}$ is maintained for the predetermined time $T_{ref}$, the controller 20 may determine that insulation breakdown between the positive side of the voltage bus 32 and the electrical chassis 70 has occurred.

When it is determined that insulation breakdown between the positive side of the voltage bus 32 and the electrical chassis 70, the controller 20 may enter a safe mode at step S160. In the safe mode, the controller 20 may shut off power supplied to the power load 30 and hydrogen supplied to the fuel cell 12. In particular, the first relay 34 and the second relay 38 may be turned off according to control signals CONT1 and CONT2 of the controller 20, such that power supplied from the power source 10 to the power load 30 may be shut off. The first valve 46 may be completely closed according to a control signal CONT3 of the controller 20 to thereby shut off the hydrogen supplied to the fuel cell 12. In addition, the second valve 56 may be completely closed according to a control signal CONT4 of the controller 20 to thereby shut off the air supplied to the fuel cell 12.

Alternatively, the controller 20 may determine whether to enter the safe mode based on a speed of the fuel cell vehicle input from the vehicle speed detector 90. In the event of a failure of the first voltage sensor 62 itself, disconnection or short-circuit of a wire connected to the first voltage sensor 62, a failure of an output signal of the first voltage sensor 62, or the like, the controller 20 may incorrectly determine that collision (or a flooding state) has occurred according to an incorrectly measured voltage of the positive side of the voltage bus 32. Accordingly, when the state where the voltage $V_P$ of the positive side of the voltage bus 32 is less than or equal to the predetermined value $V_{ref\_P}$ is maintained for the predetermined time $T_{ref}$ and the speed of the fuel cell vehicle is less than or equal to a predetermined speed, the controller 20 may enter the safe mode. The predetermined speed may be set to a value (e.g., 0 [km/h]) which is determined by a person of ordinary skill in the art. Consequently, it may be accurately determined whether the fuel cell vehicle is in the risk state such as collision or flooding state.

Figure 4:
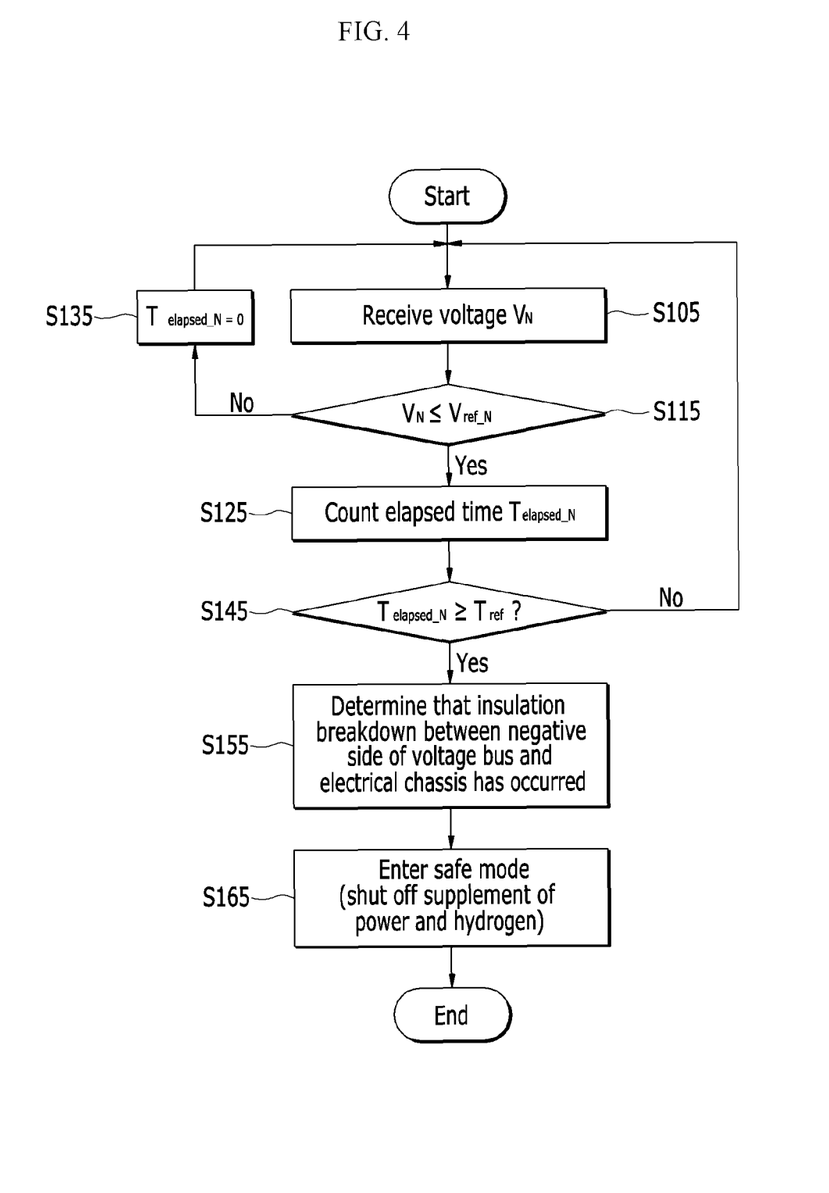
FIG. 4 is a flow chart of a method for controlling a safety apparatus of a fuel cell vehicle based on a voltage of a negative side of the voltage bus according to the first exemplary embodiment of the present invention.

FIG. 4 illustrates an exemplary method for controlling a safety apparatus of a fuel cell vehicle based on a voltage of a negative side of the voltage bus according to the first exemplary embodiment of the present invention.

Referring to FIG. 4, the method for controlling the safety apparatus of the fuel cell vehicle based on the voltage of the negative side of the voltage bus according to the first exemplary embodiment of the present invention is similar to the method for controlling the safety apparatus of the fuel cell vehicle based on the voltage of the positive side of the voltage bus shown in FIG. 2.

The controller 20 may receive the voltage $V_N$ of the negative side of the voltage bus 32 from the second voltage sensor 64 at step S105.

The controller 20 may compare the voltage $V_N$ and a predetermined value $V_{ref\_N}$ at step S115. The predetermined value $V_{ref\_N}$ may be a value close to zero, and may be set to a value which is determined by a person of ordinary skill in the art to determine whether insulation breakdown between the negative side of the voltage bus 32 and the electrical chassis 70 has occurred.

When the voltage $V_N$ is greater than or equal to the predetermined value $V_{ref\_2}$ at step S115, the controller 20 may count an elapsed time $T_{elapsed\_N}$ after the voltage $V_N$ reaches the predetermined value $V_{ref\_N}$ at step S125.

When the voltage $V_N$ is less than the predetermined value $V_{ref\_N}$ at step S115, the controller 20 may reset the counted elapsed time $T_{elapsed\_N}$ to zero at step S135. The controller 20 may compare the elapsed time $T_{elapsed\_N}$ and the predetermined time $T_{ref}$ at step S145.

When the elapsed time $T_{elapsed\_N}$ is less than the predetermined time $T_{ref}$ at step S145, the controller 20 may restart from the step S105.

When the elapsed time $T_{elapsed\_N}$ is greater than or equal to the predetermined time $T_{ref}$ at step S145, the controller 20 may determine that insulation breakdown between the negative side of the voltage bus 32 and the electrical chassis 70 has occurred at step S155.

In summary, when the state where the voltage $V_N$ of the negative side of the voltage bus 32 is greater than or equal to the predetermined value $V_{ref\_N}$ is maintained for the predetermined time $T_{ref}$, the controller 20 may determine that insulation breakdown between the negative side of the voltage bus 32 and the electrical chassis 70 has occurred.

When it is determined that insulation breakdown between the negative side of the voltage bus 32 and the electrical chassis 70 has occurred, the controller 20 may enter the safe mode at step S165.

Alternatively, the controller 20 may determine whether to enter the safe mode based on a speed of the fuel cell vehicle input from the vehicle speed detector 90. In the event of a failure of the second voltage sensor 64 itself, disconnecting or short-circuit of a wire connected to the second voltage sensor 64, a failure of an output signal of the second voltage sensor 64, or the like, the controller 20 may incorrectly determine that collision (or a flooding state) has occurred according to an incorrectly measured voltage of the negative side of the voltage bus 32. Accordingly, when the state where the voltage $V_N$ of the negative side of the voltage bus 32 is greater than or equal to the predetermined value $V_{ref\_N}$ is maintained for the predetermined time $T_{ref}$ and the speed of the fuel cell vehicle is less than or equal to the predetermined speed, the controller 20 may enter the safe mode.

Figure 5:
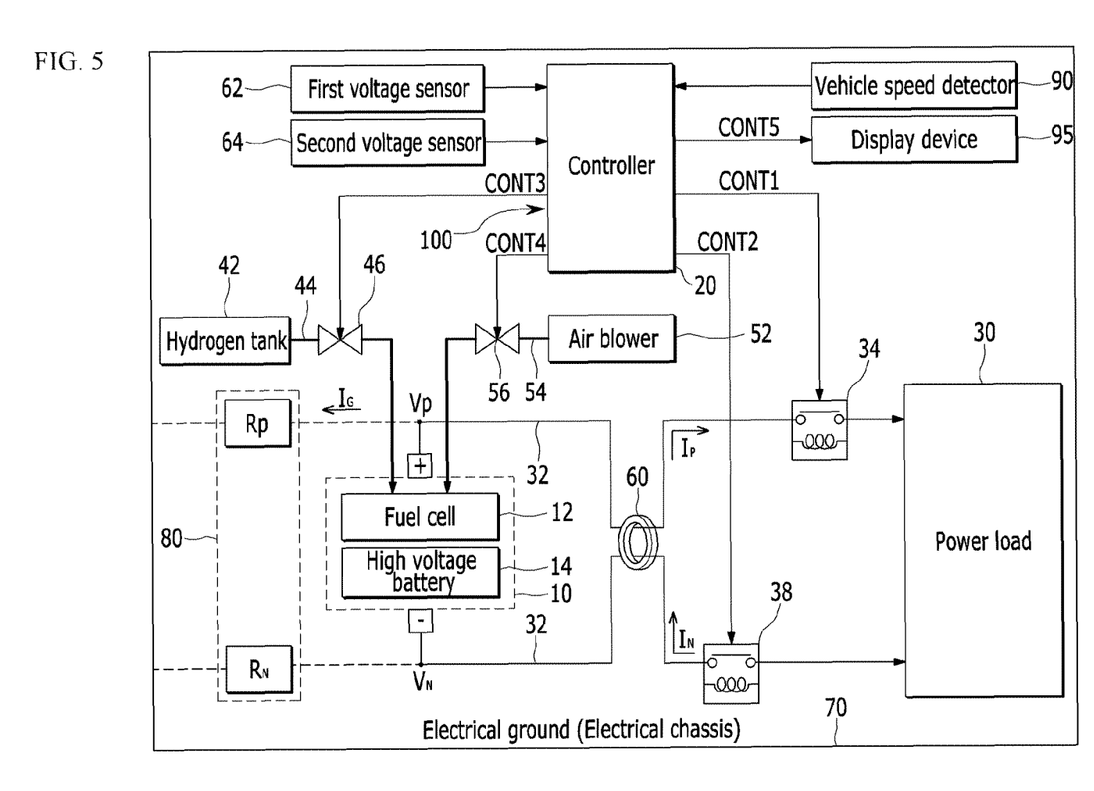
FIG. 5 is a block diagram of a fuel cell vehicle according a second exemplary embodiment of the present invention.

FIG. 5 illustrates an exemplary fuel cell vehicle according to a second exemplary embodiment of the present invention.

Referring to FIG. 5, the fuel cell vehicle according to the second exemplary embodiment of the present invention is similar to the fuel cell vehicle according to the first exemplary embodiment of the present invention, except that the fuel cell vehicle illustrated in FIG. 5 includes a zero-sequence current transformer (ZCT) 60. Therefore, descriptions of the same constituent elements as those of the first exemplary embodiment of the present invention will be omitted.

The ZCT 60 surrounds the voltage bus 32. In particular, the ZCT 60 is interposed among the power source 10, the first relay 34, and the second relay 38.

When the insulation resistors $R_P$ and $R_N$ are in the normal state, a current $I_P$ flowing through the positive side of the voltage bus 32 and a current $I_N$ flowing through the negative side of the voltage bus 32 are the same (i.e., $I_P=I_N$). Accordingly, a sum of a magnetic field $H_P$ generated by the current $I_P$ and a magnetic field $H_N$ generated by the current $I_N$ is zero (i.e., $Hp+H_N=0$), and thus no voltage is induced to the ZCT 60.

When the electrical insulation between the power source 10 and the electrical chassis 70 is failed, a leakage current $I_G$ may flow through the insulation resistor $R_P$ or $R_N$. As a result, because the sum of the magnetic fields $H_P$ and $H_N$ is not zero, a voltage is induced to the ZCT 60. The voltage induced to the ZCT 60 is transmitted to the controller 20.

The controller 20 may be implemented by at least one microprocessor executed by a predetermined program. The predetermined program may include a series of commands for performing each step included in a method for controlling the safety apparatus 100 of the fuel cell vehicle according to the second exemplary embodiment of the present invention to be described below.

Figure 6:
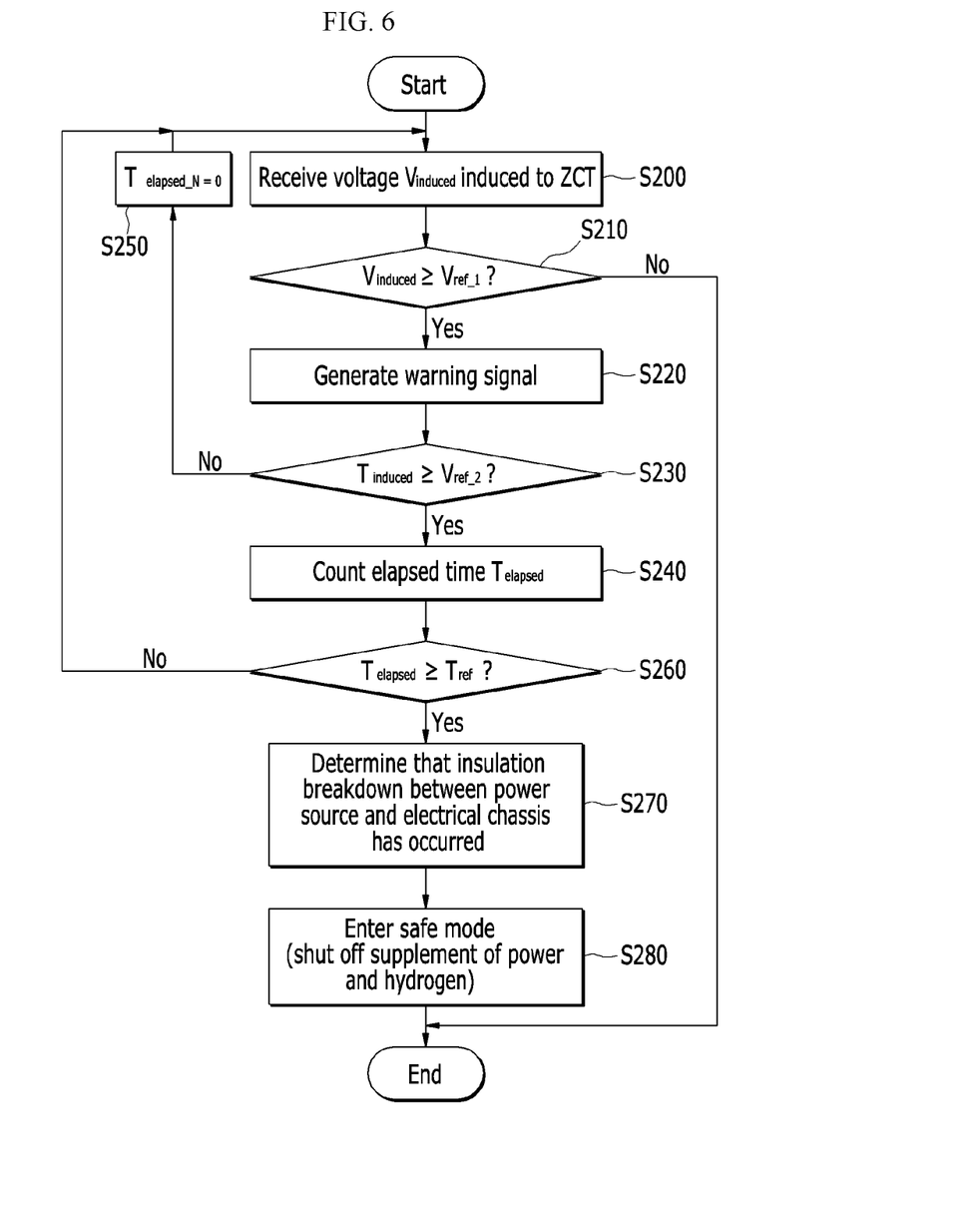
FIG. 6 is a flow chart of a method for controlling a safety apparatus of a fuel cell vehicle according to the second exemplary embodiment of the present invention.

FIG. 6 illustrates an exemplary method for controlling a safety apparatus of a fuel cell vehicle according to the second exemplary embodiment of the present invention.

Referring to FIG. 6, the controller 20 may receive the voltage $V_{induced}$ induced to the ZCT 60 at step S200.

The controller 20 may compare the voltage $V_{induced}$ and a predetermined value $V_{ref\_1}$ at step S210. The predetermined value $V_{ref\_1}$ may be set to a value which is determined by a person of ordinary skill in the art to determine whether the insulation resistance of the insulation resistor $R_P$ or $R_N$ is reduced.

When the voltage $V_{induced}$ is less than the predetermined value $V_{ref\_1}$ at step S210, the controller 20 may end the method for controlling the safety apparatus of the fuel cell vehicle according to the second exemplary embodiment of the present invention.

When the voltage $V_{induced}$ is greater than or equal to the predetermined value $V_{ref\_1}$ at step S210, the controller 20 generates a warning signal at step S220. For example, the controller 20 may apply the control signal CONT 5 to a display device 95 to inform that the electrical insulation between the power source 10 and the electrical chassis 70 is failed. In particular, in contrast to the first exemplary embodiment, a driver can know a state that insulation resistance is being reduced according to the second exemplary embodiment.

The controller 20 may compare the voltage $V_{induced}$ and a predetermined value $V_{ref\_2}$ at step S230.

The predetermined value $V_{ref\_2}$ may be a value close to a maximum voltage that can be induced to the ZCT 60, and may be set to a value which is determined by a person of ordinary skill in the art to determine whether insulation breakdown between the power source 10 and the electrical chassis 70 has occurred.

The controller 20 may count an elapsed time $T_{elapsed}$ after the voltage $V_{induced}$ reaches the predetermined value $V_{ref\_2}$ at step S240.

When the voltage $V_{induced}$ is less than the predetermined value $V_{ref\_2}$ at step S130, the controller 20 may reset the counted elapsed time $T_{elapsed}$ to zero at step S250.

The controller 20 may compare the elapsed time $T_{elapsed}$ and the predetermined time $T_{ref}$ at step S260.

When the elapsed time $T_{elapsed}$ is less than the predetermined time $T_{ref}$ at step S260, the controller 20 may restart from the step S200.

When the elapsed time $T_{elapsed}$ is greater than or equal to the predetermined time $T_{ref}$ at step S260, the controller 20 may determine that insulation breakdown between the power source 10 and the electrical chassis 70 has occurred at step S270.

In summary, when the state where the voltage $V_{induced}$ induced to the ZCT 60 is greater than or equal to the predetermined value $V_{ref\_2}$ is maintained for the predetermined time $T_{ref}$, the controller 20 may determine that insulation breakdown between the power source 10 and the electrical chassis 70 has occurred.

When it is determined that insulation breakdown between the power source 10 and the electrical chassis 70 has occurred, the controller 20 may enter the safe mode at step S280. In the safe mode, the controller 20 may shut off power supplied to the power load 30 and hydrogen supplied to the fuel cell 12. In particular, the first relay 34 and the second relay 38 may be turned off according to control signals CONT1 and CONT2 of the controller 20, such that power supplied from the power source 10 to the power load 30 may be shut off. The first valve 46 may be completely closed according to the control signal CONT3 of the controller 20 to thereby shut off the hydrogen supplied to the fuel cell 12. In addition, the second valve 56 may be completely closed according to the control signal CONT4 of the controller 20 to thereby shut off the air supplied to the fuel cell 12.

Alternatively, the controller 20 may determine whether to enter the safe mode based on the speed of the fuel cell vehicle input from the vehicle speed detector 90. In the event of a failure of the ZCT 60 itself, disconnection or short-circuit of a wire connected to the ZCT 60, a failure of an output signal of the ZCT 60, or the like, the controller 20 may incorrectly determine that collision (or a flooding state) has occurred. Accordingly, when the state where the voltage $V_{Induced}$ induced to the ZCT 60 is less than or equal to the predetermined value $V_{ref\_2}$ is maintained for the predetermined time $T_{ref}$ and the speed of the fuel cell vehicle is less than or equal to a predetermined speed, the controller 20 may enter the safe mode. The predetermined speed may be set to a value (e.g., 0 [km/h]) which is determined by a person of ordinary skill in the art. Consequently, it may be accurately determined whether the fuel cell vehicle is in the risk state such as collision or flooding state.

According to various exemplary embodiments of the present invention, it may be rapidly determined that the electrical insulation between the power source 10 and the electrical chassis 70 is maintained, compared to the conventional method of measuring the insulation resistance. In addition, the electric shock accident may be prevented by shutting off the supply of power, hydrogen, and air when the electrical insulation is failed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A safety apparatus of a fuel cell vehicle having a fuel cell and a high voltage battery that function as a power source, comprising:
   a first voltage sensor configured to measure a voltage of a positive side of a voltage bus;
   a second voltage sensor configured to measure a voltage of a negative side of the voltage bus; and
   a controller configured to determine an electrical insulation between the positive side of the voltage bus and an electrical chassis based on the voltage of the positive side of the voltage bus and determine an electrical insulation between the negative side of the voltage bus and the electrical chassis based on the voltage of the negative side of the voltage bus,
   wherein the controller determines that insulation breakdown between the positive side of the voltage bus and the electrical chassis has occurred when a state where the voltage of the positive side of the voltage bus is less than or equal to a first predetermined value is maintained for a predetermined time, and determines that insulation breakdown between the negative side of the voltage bus and the electrical chassis has occurred when a state where the voltage of the negative side of the voltage bus is greater than or equal to a second predetermined value is maintained for the predetermined time.

2. The safety apparatus of claim 1, wherein when the controller determines that the insulation breakdown between the positive side of the voltage bus and the electrical chassis or the insulation breakdown between the negative side of the voltage bus and the electrical chassis has occurred, the controller enters a safe mode.

3. The safety apparatus of claim 2, further comprising:
   a first relay disposed on the positive side of the voltage bus; and
   a second relay disposed on the negative side of the voltage bus,
   wherein the controller turns off the first relay and the second relay to shut off power supplied to the power load in the safe mode.

4. The safety apparatus of claim 2, further comprising:
   a first valve disposed on a hydrogen supply line connecting a hydrogen tank and the fuel cell to each other,
   wherein the controller is configured to open or close the first valve, and
   wherein the first valve is completely closed to shut off hydrogen supplied to the fuel cell in the safe mode.

5. The safety apparatus of claim 4, further comprising:
   a second valve disposed on an air supply line connecting an air blower and the fuel cell to each other,
   wherein the controller is configured to open or close the second valve, and
   wherein the second valve is completely closed to shut off air supplied to the fuel cell in the safe mode.

6. The safety apparatus of claim 1, further comprising:
   a vehicle speed detector configured to detect a speed of the fuel cell vehicle, wherein when a state where the voltage of the positive side of the voltage bus is less than or equal to the first predetermined value is maintained for the predetermined time and the speed of the fuel cell vehicle is less than or equal to a predetermined speed, or when a state where the voltage of the negative side of the voltage bus is greater than or equal to the second predetermined value is maintained for the predetermined time and the speed of the fuel cell vehicle is less than or equal to the predetermined speed, the controller enters the safe mode.

7. A method for controlling a safety apparatus of a fuel cell vehicle having a fuel cell and a high voltage battery that function as a power source, comprising the steps of:
   receiving a voltage of a positive side of a voltage bus and a voltage of a negative side of the voltage bus;
   determining that insulation breakdown between the positive side of the voltage bus and an electrical chassis has occurred when a state where the voltage of the positive side of the voltage bus is less than or equal to a first predetermined value is maintained for a predetermined time; and
   determining that insulation breakdown between the negative side of the voltage bus and the electrical chassis has occurred when a state where the voltage of the negative side of the voltage bus is greater than or equal to a second predetermined value is maintained for the predetermined time.

8. The method of claim 7, further comprising the step of:
   entering a safe mode when it is determined that the insulation breakdown between the positive side of the voltage bus and the electrical chassis or the insulation breakdown between the negative side of the voltage bus and the electrical chassis has occurred.

9. The method of claim 8, further comprising the steps of:
   turning off a first relay disposed on the positive side of the voltage bus in the safe mode;
   turning off a second relay disposed on the negative side of the voltage bus in the safe mode;

completely closing a first valve disposed on a hydrogen supply line connecting a hydrogen tank and the fuel cell to each other in the safe mode; and completely closing a second valve disposed on an air supply line connecting an air blower and the fuel cell to each other in the safe mode.

10. A safety apparatus of a fuel cell vehicle having a fuel cell and a high voltage battery that function as a power source, comprising:

a zero-sequence current transformer (ZCT) surrounding a voltage bus;

a controller configured to determine an electrical insulation between the power source and an electrical chassis based on a voltage induced to the ZCT; and a vehicle speed detector configured to detect a speed of the fuel cell vehicle, wherein the controller generates a warning signal when the voltage induced to the ZCT is greater than or equal to a first predetermined value, and wherein when a state where the voltage induced to the ZCT is greater than or equal to the second predetermined value is maintained for the predetermined time and the speed of the fuel cell vehicle is less than or equal to a predetermined speed, the controller enters a safe mode.

11. The safety apparatus of claim 10, wherein the controller determines that insulation breakdown between the power source and the electrical chassis has occurred when a state where the voltage induced to the ZCT is greater than or equal to a second predetermined value is maintained for a predetermined time.

12. The safety apparatus of claim 11, wherein when the controller determines that the insulation breakdown between the power source and the electrical chassis has occurred, the controller enters a safe mode.

13. The safety apparatus of claim 12, further comprising:
a first relay disposed on a positive side of the voltage bus; and
a second relay disposed on a negative side of the voltage bus,
wherein the controller turns off the first relay and the second relay to shut off power supplied to the power load in the safe mode.

14. The safety apparatus of claim 13, wherein the ZCT is interposed among the power source, the first relay, and the second relay.

15. The safety apparatus of claim 12, further comprising:
a first valve disposed on a hydrogen supply line connecting a hydrogen tank and the fuel cell to each other,
wherein the controller is configured to open or close the first valve, and
wherein the first valve is completely closed to shut off hydrogen supplied to the fuel cell in the safe mode.

16. The safety apparatus of claim 15, further comprising:
a second valve disposed on an air supply line connecting an air blower and the fuel cell to each other,
wherein the controller is configured to open or close the second valve, and
wherein the second valve is completely closed to shut off air supplied to the fuel cell in the safe mode.

17. A method for controlling a safety apparatus of a fuel cell vehicle having a fuel cell and a high voltage battery as a power source, comprising the steps of:

receiving a voltage induced to a zero-sequence current transformer (ZCT) surrounding a voltage bus;

generating a warning signal when the voltage induced to the ZCT is greater than or equal to a first predetermined value;

determining that insulation breakdown between the power source and an electrical chassis has occurred when a state where the voltage induced to the ZCT is greater than or equal to a second predetermined value is maintained for a predetermined time;

entering a safe mode when determining that the insulation breakdown between the power source and the electrical chassis has occurred;

turning off a first relay disposed on a positive side of the voltage bus in the safe mode;

turning off a second relay disposed on a negative side of the voltage bus in the safe mode;

completely closing a first valve disposed on a hydrogen supply line connecting a hydrogen tank and the fuel cell to each other in the safe mode; and completely closing a second valve disposed on an air supply line connecting an air blower and the fuel cell to each other in the safe mode.

* * * * *